US012623237B2

(12) United States Patent
Dettlaff

(10) Patent No.: US 12,623,237 B2
(45) Date of Patent: May 12, 2026

(54) FLUID RESERVOIR FOR A SPRAY GUN WITH A VENTILATION DEVICE

(71) Applicant: SATA GmbH & Co. KG, Kornwestheim (DE)

(72) Inventor: Peter Dettlaff, Remseck (DE)

(73) Assignee: SATA GmbH & Co. KG, Kornwestheim (DE)

( * ) Notice: Subject to any disclaimer, the term of this patent is extended or adjusted under 35 U.S.C. 154(b) by 234 days.

(21) Appl. No.: 18/017,918

(22) PCT Filed: Jul. 29, 2021

(86) PCT No.: PCT/EP2021/071255

§ 371 (c)(1), (2) Date: Jan. 25, 2023

(87) PCT Pub. No.: WO2022/023468

PCT Pub. Date: Feb. 3, 2022

(65) Prior Publication Data

US 2023/0286000 A1 Sep. 14, 2023

(30) Foreign Application Priority Data

Jul. 31, 2020 (DE) ..................... 10 2020 120 228.8

(51) Int. Cl.
*B05B 7/24* (2006.01)

(52) U.S. Cl.
CPC .......... *B05B 7/2408* (2013.01); *B05B 7/2478* (2013.01)

(58) Field of Classification Search
CPC ............................ B05B 7/2478; B05B 7/2408
(Continued)

(56) References Cited

U.S. PATENT DOCUMENTS 2,595,317 A 5/1952 White
3,090,530 A * 5/1963 Peeps ...................... B05B 7/241 222/400.7
(Continued)

FOREIGN PATENT DOCUMENTS

BE 1018968 A3 12/2011
CN 1541176 A 10/2004
(Continued)

OTHER PUBLICATIONS

International Search Report and Written Opinion for PCT/IB2021/000373, filed Apr. 7, 2021.
(Continued)

*Primary Examiner* — Chee-Chong Lee
(74) *Attorney, Agent, or Firm* — Fleit Intellectual Property Law; Paul D. Bianco

(57) ABSTRACT

A fluid reservoir for a spray gun, which fluid reservoir has a material outlet which is configured for the direct and/or indirect connection to a spray gun. The fluid reservoir has a ventilation device, via which air can flow into the fluid reservoir in order to ensure a pressure compensation when coating material flows out from the fluid reservoir via the material outlet. Advantageously, the ventilation device includes a device on the outside of the fluid reservoir and separately to a ventilation opening and a latching device, which device cooperates as a centering device, a retaining device and/or a guide device with the closure element.

21 Claims, 8 Drawing Sheets

(58) Field of Classification Search
USPC .......................................................... 239/407
See application file for complete search history.

(56) References Cited

U.S. PATENT DOCUMENTS

| | | | | |
|---|---|---|---|---|
| 3,270,920 | A | 9/1966 | Nessler | |
| 3,401,842 | A | 9/1968 | Morrison | |
| 3,524,589 | A * | 8/1970 | Pelton, Jr. | B05B 7/2421 239/409 |
| 3,714,967 | A * | 2/1973 | Zupan | B05B 7/2408 239/318 |
| 4,151,929 | A | 5/1979 | Sapien | |
| 4,270,668 | A | 6/1981 | Berfield | |
| 4,388,997 | A | 6/1983 | Grime | |
| 4,430,084 | A | 2/1984 | Deaton | |
| 4,730,753 | A * | 3/1988 | Grime | B05B 7/2408 222/630 |
| 5,582,350 | A * | 12/1996 | Kosmyna | B05B 15/55 239/DIG. 14 |
| 5,588,562 | A * | 12/1996 | Sander | B65D 41/3447 222/541.6 |
| 5,713,519 | A | 2/1998 | Sandison | |
| 5,797,520 | A | 8/1998 | Donahue | |
| 6,039,218 | A * | 3/2000 | Beck | B65D 41/3447 222/521 |
| 6,435,426 | B1 | 8/2002 | Copp | |
| 6,474,515 | B1 | 11/2002 | Ladina | |
| D474,528 | S | 5/2003 | Huang | |
| 6,820,824 | B1 | 11/2004 | Joseph | |
| 6,877,677 | B2 | 4/2005 | Schmon | |
| 7,083,119 | B2 | 8/2006 | Bouic | |
| 7,175,110 | B2 | 2/2007 | Vicentini | |
| D574,926 | S | 8/2008 | Huang | |
| 7,416,140 | B2 | 8/2008 | Camilleri | |
| 7,568,638 | B2 | 8/2009 | Gehrung | |
| 7,575,126 | B2 | 8/2009 | Kemper | |
| 7,614,571 | B2 | 11/2009 | Camilleri | |
| 7,694,896 | B2 | 4/2010 | Tumbull | |
| 7,798,427 | B2 | 9/2010 | Joseph | |
| 7,810,744 | B2 * | 10/2010 | Schmon | B05B 7/2408 239/320 |
| 7,819,341 | B2 | 10/2010 | Schmon | |
| 7,823,806 | B2 | 11/2010 | Schmon | |
| D644,803 | S | 9/2011 | Schmon | |
| 8,052,071 | B2 | 11/2011 | Kruse | |
| 8,297,536 | B2 | 10/2012 | Ruda | |
| 8,444,067 | B2 | 5/2013 | Schmon | |
| D689,590 | S | 9/2013 | Brose | |
| D692,530 | S | 10/2013 | Gehrung | |
| D692,532 | S | 10/2013 | Li | |
| 8,925,836 | B2 | 1/2015 | Dettlaff | |
| 9,259,960 | B1 | 2/2016 | Tepsi | |
| D758,533 | S | 6/2016 | Dettlaff | |
| 9,878,336 | B2 | 1/2018 | Gehrung | |
| D810,865 | S | 2/2018 | Hegdahl | |
| D815,248 | S | 4/2018 | Hegdahl | |
| 10,357,789 | B2 | 7/2019 | Camilleri | |
| 10,434,527 | B1 | 10/2019 | Smitshoek | |
| 10,471,450 | B2 | 11/2019 | Kruse | |
| D916,231 | S | 4/2021 | Xiao | |
| D916,232 | S | 4/2021 | Xiao | |
| D952,097 | S | 5/2022 | Kang | |
| D953,485 | S | 5/2022 | Xiao | |
| 2003/0006310 | A1 | 1/2003 | Rothrum | |
| 2005/0155968 | A1 | 7/2005 | Kosmyna | |
| 2005/0156058 | A1 | 7/2005 | Kosmyna | |
| 2006/0102550 | A1 | 5/2006 | Joseph | |
| 2006/0113409 | A1 | 6/2006 | Camilleri | |
| 2006/0196891 | A1 | 9/2006 | Gerson | |
| 2006/0283861 | A1 | 12/2006 | Kosmyna | |
| 2007/0018016 | A1 | 1/2007 | Yechouron | |
| 2007/0158349 | A1 | 7/2007 | Schmon | |
| 2007/0158462 | A1 | 7/2007 | Delbridge | |
| 2007/0164058 | A1 | 7/2007 | Burkovskiy | |
| 2007/0221754 | A1 | 9/2007 | Gehrung | |
| 2007/0272323 | A1 | 11/2007 | Verhaeghe | |
| 2008/0011879 | A1 | 1/2008 | Gerson | |
| 2008/0179763 | A1 | 7/2008 | Schmon | |
| 2009/0014557 | A1 | 1/2009 | Schmon | |
| 2009/0072050 | A1 | 3/2009 | Ruda | |
| 2009/0108089 | A1 | 4/2009 | Handzel | |
| 2010/0288772 | A1 | 11/2010 | Wambeke | |
| 2011/0174901 | A1 | 7/2011 | Dettlaff | |
| 2012/0000992 | A1 | 1/2012 | Shih | |
| 2012/0043352 | A1 | 2/2012 | Rasmussen et al. | |
| 2012/0267388 | A1 | 10/2012 | Tom | |
| 2012/0273583 | A1 | 11/2012 | Gerson | |
| 2012/0280062 | A1 | 11/2012 | Pellegrino | |
| 2012/0291890 | A1 | 11/2012 | Pan | |
| 2013/0001317 | A1 | 1/2013 | Staunton | |
| 2014/0131380 | A1 | 5/2014 | Pethe | |
| 2014/0332532 | A1 | 11/2014 | Wang | |
| 2015/0108135 | A1 | 4/2015 | Hanna | |
| 2016/0052002 | A1 | 2/2016 | Schulz | |
| 2016/0303594 | A1 | 10/2016 | Nyarbo | |
| 2017/0203887 | A1 | 7/2017 | Hegdahl | |
| 2017/0239679 | A1 | 8/2017 | Bierie | |
| 2018/0147586 | A1 | 5/2018 | Kruse | |
| 2018/0185869 | A1 | 7/2018 | Hegdahl | |
| 2019/0126300 | A1 | 5/2019 | Li | |
| 2020/0094276 | A1 | 3/2020 | Sun | |
| 2021/0078024 | A1 | 3/2021 | Hegdahl | |
| 2021/0197153 | A1 | 7/2021 | Schreiber | |
| 2022/0001406 | A1 | 1/2022 | Ruda | |
| 2022/0080435 | A1 | 3/2022 | Joseph | |
| 2023/0143762 | A1 | 5/2023 | Gehrung | |
| 2023/0173515 | A1 | 6/2023 | Gehrung | |
| 2023/0271201 | A1 | 8/2023 | Dettlaff | |
| 2023/0271202 | A1 | 8/2023 | Dettlaff | |
| 2023/0278050 | A1 | 9/2023 | Dettlaff | |

FOREIGN PATENT DOCUMENTS

| | | | |
|---|---|---|---|
| CN | 300700565 | | 10/2007 |
| CN | 101188960 | A | 5/2008 |
| CN | 101856639 | A | 10/2010 |
| CN | 201702089 | U | 1/2011 |
| CN | 302042040 | S | 8/2012 |
| CN | 204710607 | U | 10/2015 |
| CN | 207188095 | U | 4/2018 |
| CN | 108745690 | A | 11/2018 |
| CN | 208711972 | U | 4/2019 |
| CN | 208824797 | U | 5/2019 |
| CN | 110252563 | A | 9/2019 |
| CN | 209997827 | U | 1/2020 |
| CN | 209997846 | U | 1/2020 |
| CN | 111389608 | A | 7/2020 |
| CN | 212418369 | U | 1/2021 |
| CN | 212441781 | U | 2/2021 |
| CN | 306409970 | S | 3/2021 |
| CN | 212951930 | U | 4/2021 |
| CN | 213435249 | U | 6/2021 |
| CN | 306692658 | S | 7/2021 |
| CN | 213967319 | U | 8/2021 |
| CN | 214021611 | U | 8/2021 |
| CN | 214183647 | U | 9/2021 |
| CN | 214183730 | U | 9/2021 |
| CN | 214347419 | U | 10/2021 |
| CN | 307123783 | S | 2/2022 |
| CN | 307187974 | S | 3/2022 |
| CN | 307446605 | S | 3/2022 |
| CN | 307231888 | S | 4/2022 |
| CN | 307381847 | S | 6/2022 |
| CN | 307382238 | S | 6/2022 |
| CN | 217043051 | U | 7/2022 |
| CN | 307456884 | S | 7/2022 |
| CN | 217450601 | U | 9/2022 |
| CN | 307525222 | S | 9/2022 |
| CN | 307525223 | S | 9/2022 |
| CN | 307525224 | S | 9/2022 |
| CN | 307525228 | S | 9/2022 |
| CN | 307525229 | S | 9/2022 |
| CN | 307525230 | S | 9/2022 |
| CN | 307525231 | S | 9/2022 |

(56) References Cited

FOREIGN PATENT DOCUMENTS

| | | | |
|---|---|---|---|
| CN | 307554049 | S | 9/2022 |
| CN | 307554055 | S | 9/2022 |
| CN | 307629829 | S | 11/2022 |
| CN | 307816807 | S | 1/2023 |
| CN | 307903137 | S | 3/2023 |
| CN | 307903138 | S | 3/2023 |
| CN | 116620706 | A | 8/2023 |
| CN | 116967040 | A | 10/2023 |
| CN | 308254869 | S | 10/2023 |
| CN | 308254870 | S | 10/2023 |
| CN | 219970514 | U | 11/2023 |
| DE | 8024829 | U1 | 8/1982 |
| DE | 3242306 | A1 | 5/1984 |
| DE | 3402097 | A1 | 8/1985 |
| DE | 3517122 | C1 | 5/1986 |
| DE | 8813520 | U1 | 12/1988 |
| DE | 8815639 | U1 | 2/1989 |
| DE | 8902223 | U1 | 4/1989 |
| DE | 3815327 | A1 | 11/1989 |
| DE | 29702206 | U1 | 3/1997 |
| DE | 20202123 | U1 | 2/2003 |
| DE | 10213715 | A1 | 5/2003 |
| DE | 202004002445 | U1 | 6/2005 |
| DE | 202004002563 | U1 | 6/2005 |
| DE | 202004003116 | U1 | 7/2005 |
| DE | 202004003376 | U1 | 7/2005 |
| DE | 10 2004 003 439 | A1 | 8/2005 |
| DE | 10 2004 007 733 | A1 | 9/2005 |
| DE | 102004021298 | A1 | 11/2005 |
| DE | 202004014049 | U1 | 1/2006 |
| DE | 102006029802 | A1 | 3/2007 |
| DE | 202005020437 | U1 | 5/2007 |
| DE | 602004002475 | T2 | 6/2007 |
| DE | 102005063001 | A1 | 7/2007 |
| DE | 202006018491 | U1 | 4/2008 |
| DE | 202007001832 | U1 | 6/2008 |
| DE | 102007039106 | B4 | 2/2009 |
| DE | 202008014389 | U1 | 4/2010 |
| DE | 202009007151 | U1 | 10/2010 |
| DE | 102010012541 | A1 | 12/2010 |
| DE | 102009034715 | A1 | 1/2011 |
| DE | 102011008316 | A1 | 3/2012 |
| DE | 202014102561 | U1 | 7/2014 |
| DE | 10 2004 018 140 | A1 | 7/2015 |
| DE | 202015003663 | U1 | 9/2016 |
| DE | 102015006483 | A1 | 11/2016 |
| DE | 202017002680 | U1 | 8/2018 |
| DE | 102020109488 | A1 | 10/2021 |
| DE | 102020124381 | A1 | 3/2022 |
| EM | 000716527-0001 | | 5/2007 |
| EM | 000716527-0002 | | 5/2007 |
| EM | 000716527-0003 | | 5/2007 |
| EM | 000716527-0006 | | 5/2007 |
| EP | 1424135 | A1 | 6/2004 |
| EP | 1658143 | A2 | 5/2006 |
| EP | 1975079 | A1 | 10/2008 |
| EP | 1990099 | A1 | 11/2008 |
| EP | 2027931 | B1 | 2/2009 |
| EP | 2277628 | A2 | 1/2011 |
| EP | 2669213 | A1 | 12/2013 |
| EP | 2982443 | A1 | 2/2016 |
| EP | 3 053 656 | A1 | 8/2016 |
| EP | 3 078 426 | A1 | 10/2016 |
| ES | 2594332 | | 12/2016 |
| FR | 2968581 | A1 | 6/2012 |
| FR | 2982250 | A1 | 5/2013 |
| JP | 7063814 | B2 | 5/2022 |
| KR | 20150065665 | A | 6/2015 |
| WO | 2001/40102 | A1 | 6/2001 |
| WO | 2005/018815 | A2 | 3/2005 |
| WO | 2005/070557 | A1 | 8/2005 |
| WO | 2005/077543 | A1 | 8/2005 |
| WO | 07/003245 | A1 | 1/2007 |
| WO | 2007/079188 | A2 | 7/2007 |
| WO | 2009/054986 | A1 | 4/2009 |
| WO | 2009/090273 | A1 | 7/2009 |
| WO | 2010/044864 | A1 | 4/2010 |
| WO | 2011/047876 | A2 | 4/2011 |
| WO | 2011/090857 | A1 | 7/2011 |
| WO | 2012/009284 | A2 | 1/2012 |
| WO | 2013/131626 | A1 | 9/2013 |
| WO | 2013/134182 | A1 | 9/2013 |
| WO | 2013/165556 | A1 | 11/2013 |
| WO | 2017/146993 | A1 | 8/2017 |
| WO | 2018/019412 | A1 | 2/2018 |
| WO | 2019/162397 | A1 | 8/2019 |
| WO | 20/006861 | A1 | 1/2020 |
| WO | 2021/028401 | A1 | 2/2021 |
| WO | 2021/204885 | A1 | 10/2021 |
| WO | 2021/205236 | A1 | 10/2021 |
| WO | 2022/023465 | A1 | 2/2022 |
| WO | 2022/023466 | A1 | 2/2022 |
| WO | 2022/023467 | A1 | 2/2022 |
| WO | 2022/023468 | A1 | 2/2022 |
| WO | 22/218119 | A1 | 10/2022 |
| WO | 23/035890 | A1 | 3/2023 |
| WO | 23/061205 | A1 | 4/2023 |
| WO | 226675 | | 4/2023 |

OTHER PUBLICATIONS

Search Report dated Sep. 26, 2020, for German Patent Application No. 10 2020 109 914.2.

English translation of Written Opinion for PCT/EP2021/059080, filed Apr. 7, 2021.

English translation of Written Opinion for PCT/IB2021/000373 filed Apr. 7, 2021.

International Search Report and Written Opinion for PCT/EP2021/71254, filed Jul. 29, 2021.

International Search Report and Written Opinion for PCT/EP2021/71252, filed Jul. 29, 2021.

International Search Report and Written Opinion for PCT/EP2021/71255, filed Jul. 29, 2021.

International Search Report and Written Opinion for PCT/EP2021/71253, filed Jul. 29, 2021.

Search Report for DE 10 2020 120 226.1, dated Dec. 22, 2020.

Search Report for DE 10 2020 120 229.6, dated Dec. 22, 2020.

Search Report for DE 10 2020 120 228.8, dated Dec. 22, 2020.

Search Report for DE 10 2020 120 231.8, dated Dec. 22, 2020.

International Preliminary Report on Patentability dated Jan. 31, 2023, with Written Opinion, for PCT/EP2021/071254, filed Jul. 29, 2021.

International Preliminary Report on Patentability dated Jan. 31, 2023, with Written Opinion, for PCT/EP2021/071252, filed Jul. 29, 2021.

International Preliminary Report on Patentability dated Jan. 31, 2023, with Written Opinion, for PCT/EP2021/071255, filed Jul. 29, 2021.

International Search Report and Written Opinion for PCT/EP2021/059080, filed Apr. 7, 2021.

Search Report dated Sep. 18, 2020, for German Application No. 10 2020 109 913.4.

For Design U.S. Appl. No. 29/510,723: Restriction Requirement dated Nov. 3, 2015 Response filed Jan. 4, 2016 Notice of Allowance dated Jan. 27, 2016.

For U.S. Appl. No. 15/575,585: Office Action dated Jul. 18, 2018, Response filed Nov. 9, 2018 Final Rejection dated Feb. 5, 2019, Response filed Jun. 5, 2019 Notice of allowance dated Jul. 10, 2019.

For PCT/EP2016/000809: International Preliminary Report on Patentability, dated Nov. 28, 2018 Written Opinion, dated Aug. 4, 2016 International Search Report, dated Jul. 14, 2016.

Office Action dated Dec. 16, 2024 for U.S. Appl. No. 17/917,619.

Notification of the First Office Action dated Apr. 23, 2025 with Search Report dated Apr. 1, 2025 for Chinese Application No. 2021800585545.

Final Office Action dated Sep. 2, 2026 for U.S. Appl. No. 17/917,641.

(56) References Cited

OTHER PUBLICATIONS

Notification of the Second Office Action for Chinese Patent Application No. 2025101101266810 dated Oct. 11, 2025.

* cited by examiner

FLUID RESERVOIR FOR A SPRAY GUN WITH A VENTILATION DEVICE

FIELD OF THE INVENTION

The invention relates to a flow cup for a spray gun, which has a material outlet which is designed for direct and/or indirect connection to a spray gun, the flow cup having a ventilation device through which air can flow into the flow cup in order to equalize the pressure when coating material flows out of the flow cup via the material outlet, the ventilation device comprising a closure element which can be moved between at least one open position, in which air can flow into the flow cup, and a closed position, in which no air can flow through the ventilation device into the flow cup, the closure element having a closure plug which, in the closed position of the closure element, closes a ventilation opening in the flow cup, and provided separately from the ventilation opening is a latching device, in particular a (first) hollow collar, by means of which the closure element can be held in a latching manner at least in the closed position.

BACKGROUND

A flow cup of this type is known, for example, from DE 10 2004 007 733 A1. The flow cup described therein comprises a cup-shaped container and a cover that can be screwed onto it via a thread. On its upper side, the cover has an outlet port with an outlet opening, which is designed for direct or indirect (by means of an adapter) connection to a spray gun. This is a so-called upside-down flow cup, which is mounted on a spray gun with the cover facing down.

When coating a surface with the aid of the spray gun equipped with the flow cup, coating material, e.g. paint, by virtue of gravity and optionally of a suction effect generated at the nozzle head of the spray gun, flows via the outlet port from the flow cup into the spray gun. In order to ensure pressure equalization when coating material flows out of the flow cup via the outlet port, the bottom of the cup-shaped container is provided with a ventilation valve. The ventilation valve comprises a hollow collar, the wall of which projects perpendicularly outwards from the bottom of the container. A ventilation opening in the bottom of the container is placed so as to be centric in relation to the hollow collar. A plurality of latching ribs are provided on the external circumference of the hollow collar, which are used to hold a cap-shaped closure element in a closed position, in which a centric closure plug of the closure element closes the ventilation opening. The closure element is able to be moved back and forth between the closed position and at least one open position. In particular, this is a snap-in valve.

Flow cups with ventilation devices in the form of snap-in valves of a similar construction have also become known from the documents DE 10 2006 029 802 A1, EP 2 277 628 B1 and EP 1 658 143 A2.

In practice, flow cups with ventilation devices of this type have proven successful. However, the flow cup and in particular the associated ventilation device must meet enormous demands in terms of long-lasting functional reliability, even with repeated opening and closing under the intensive influence of solvents and after prolonged storage of various substances in the flow cup.

SUMMARY OF THE INVENTION

Accordingly, one aspect of the invention relates to increasing the functional reliability of the ventilation devices of generic flow cups.

Various embodiments of a flow cup are disclosed herein.

The flow cup according to the invention is characterized in that provided separately on the outside of the flow cup, in particular at a spacing from the ventilation opening and separately, in particular spaced apart from the latching device, is a device which as a centering, retaining and/or guiding device interacts with the closure element.

The latching device is preferably fastened to the outside of the flow cup and not to the closure element. The latching device is designed in particular as a hollow collar which preferably extends perpendicularly to the region of the outside of the flow cup on which it is disposed and/or which projects in relation to the outside of the flow cup. In particular, the hollow collar is embodied so as to be integral to the region of the outside of the flow cup on which it is disposed.

In the case of a more general implementation of the inventive concept, instead of the latching device, a device for holding the closure element at least in the closed position is generally provided, the closure element being held at least in the closed position by means of the device, for example in a form-fitting and/or force-fitting manner.

If the additional device according to the invention already fulfils one of the functions of centering, retaining or guiding, the functional reliability of the ventilation device is increased since any (possibly only temporary) impairment of the other components, in particular the latching device or the sealing plug with regard to one of the functions guiding, retaining or centering, can be compensated for.

The additional device fulfils a guiding function if it also defines or controls the path of movement of the closure element between the closed position and the open position, at least in portions.

The closure element is preferably guided along a rectilinear path of movement between the closed position and the open position. In alternative exemplary embodiments, the closure element can also be guided along a curved path of movement or rotated, turned or tilted in order to convert it from the closed position to the open position and back.

The centering function is implemented by the separate additional device if the latter is designed in such a manner that it can return the closure element to a desired path of movement should it accidentally perform an incorrect movement. In this sense, the centering serves to align the closure element with respect to the cup-proximal components of the ventilation device. In particular, the centering causes the sealing plug to be aligned with respect to the ventilation opening.

The retaining function refers to retaining the coating material contained in the flow cup. In particular, this is a sealing function if the coating material can be retained almost completely.

In the context of the invention, not all three functions have to be performed by one and the same additional device. One device can also be provided for each of the functions, only two of the functions (i.e. two devices each with one function) or even only one device with only one of the three functions.

However, the additional device is preferably designed in such a manner that it can provide all three functions (guiding, retaining, centering).

In the case of a particularly preferred exemplary embodiment, the separate centering, retaining and/or guiding device is designed as a second hollow collar on the outside of the flow cup. The result is a construction of the centering, retaining and/or guiding device that is advantageous in terms of manufacturing technology and is robust.

The second hollow collar preferably extends perpendicularly to the region of the outside of the flow cup on which it is disposed and/or projects in relation to the outside of the flow cup. In particular, the second hollow collar is embodied so as to be integral to the region of the outside of the flow cup on which it is disposed.

In particular, the second hollow collar can provide all three functions (guiding, retaining and centering) by simple constructive means.

In particular, a centering chamfer on the outer opening of the second hollow collar serves to center the closure element. The circumferential wall of the second hollow collar serves to guide the closure element, in that the closure element slides along the circumferential wall (inside or outside) during at least a portion of the closing and/or opening movement. Finally, circumferential contact of the closure element against the circumferential wall of the second hollow collar (inside or outside), in particular in the closed position, can cause coating material to be retained.

The separate centering, retaining and/or guiding device is preferably disposed radially between the latching device, preferably embodied as a first hollow collar, and the ventilation opening on the outside of the flow cup.

In a particularly preferred exemplary embodiment, the closure element has a component which is separate from the closure plug, in particular at a spacing therefrom, and which interacts with the separate centering, retaining and/or guiding device. The sealing plug is one of the components of which the functionality is particularly at risk due to damage, dirt or other impairments. In order for the separate centering, retaining and/or guiding device to be able to have a compensating effect particularly in the event of a functional impairment of the sealing plug, it is advantageous for it to not interact with the sealing plug but with a device separate from the sealing plug.

The separate component is preferably provided with latching means which interact with the latching means on the latching device (first hollow collar) on the outside of the flow cup.

An exemplary embodiment in which the separate component is designed in the form of a third hollow collar is distinguished by manufacturing advantages and a robust design.

In the case of a particularly preferred exemplary embodiment, the closure plug projects axially in relation to the third hollow collar which is disposed on the closure element. This ensures that the sealing plug can still penetrate the ventilation opening to a sufficient depth in order to seal the opening securely and tightly, even if the third hollow collar comes to rest on the outside of the flow cup.

The sealing plug particularly preferably protrudes by a distance in relation to the third hollow collar, which at least almost corresponds to the wall thickness of the flow cup in the region of the ventilation device, whereby a sufficient penetration depth of the sealing plug in the ventilation opening can be ensured, and on the other hand it is prevented that the sealing plug inside the flow cup projects in relation to the inner wall. A protruding stopper tip can interfere with the mixing of coating material in the flow cup and entails the risk that the stopper will be pushed outward by a stirrer, so that the ventilation device will be accidentally opened.

Alternatively or additionally, a protruding stopper tip can be prevented in that the closure stopper has a shoulder which, when interacting with a periphery of the ventilation opening, serves as an axial stop.

The functional reliability of the ventilation device is further increased in that a fourth hollow collar is provided on the outside of the flow cup, which forms the periphery of the ventilation opening, the fourth hollow collar being embodied for centering the sealing plug when the ventilation opening is closed. The outer opening of the fourth hollow collar is preferably provided with a centering chamfer for this purpose.

The fourth hollow collar preferably extends perpendicularly to the region of the outside of the flow cup on which it is disposed and/or projects in relation to the outside of the flow cup. In particular, the fourth hollow collar is embodied so as to be integral to the region of the outside of the flow cup on which it is disposed.

In a preferred variant of the invention, the interaction of the various components takes place in such a manner that the closure element is guided during the movement between an open position and the closed position by an interaction of the first hollow collar on the outside of the flow cup and of the third hollow collar, which is disposed on the closure element, wherein the closure element can also be centered and/or guided at the end of the closing movement by the separate centering, retaining and/or guiding device. In this way, the end portion of the closing movement of the closure element, which is particularly relevant for functionally reliable closing of the ventilation device, is advantageously assisted or secured by the separate centering, retaining and/or guiding device.

In the closed position of the closure element, the separate centering, retaining and/or guiding device preferably fulfils a sealing effect by sealing contact of the third hollow collar with the separate centering, retaining and/or guiding device.

Tilting of the closure element is counteracted particularly effectively in that the end face of the third hollow collar in the closed position of the closure element is disposed in an annular space which is configured between the latching device (first hollow collar) on the outside of the flow cup and the separate centering, retaining and/or or guiding device.

Handling advantages result in the case of a particularly preferred exemplary embodiment if the closure element is designed in the shape of a cap with a cap plate from which the closure stopper and/or a (third) hollow collar project/projects. The cap plate serves as an easily accessible control element.

The cap-shaped closure element is preferably embodied in such a manner that it can also serve as a closure cap for the material outlet of the flow cup.

Material is saved if the closure element is designed in the shape of a cap with a cap plate which is provided with a number of openings and/or which has a centric hollow protuberance that forms the closure plug. The openings in the cap plate can also be advantageous for demolding when the closure element is manufactured in an injection-molding process.

It goes without saying that the closure element of the ventilation device according to the invention does not have to have a single open position and a single closed position. In particular, the ventilation device can be embodied in such a manner that the closure element can be moved between two end positions, the ventilation device being closed in the first end position and being open in the second end position (maximum open position). In the intermediate positions of the closure element, the ventilation device can be closed or open, depending on the design.

A refinement of the invention is characterized by advantageously embodied latching means, in which the third hollow collar, which is disposed on the closure element, is provided with first latching lugs on the external circumference, which interact with the latching means on the latching device (first hollow collar) on the outside of the flow cup, in order to hold the closure element in the closed position, and/or the third hollow collar is provided with second latching lugs on the external circumference, which interact with the latching means on the latching device (first hollow collar) on the outside of the flow cup in order to keep the closure element captive in a maximum open position on the flow cup.

Likewise advantageous latching means result if the latching device embodied as a first hollow collar is provided with an (encircling or segmented) latching edge for the closure element on the outside of the flow cup in the region of its end face on the inner circumference.

In the case of a particularly preferred variant, the flow cup has a material container and a cover that closes the material container in a fluid-tight and releasable manner.

The material outlet, which is designed in particular as an outlet port, is preferably disposed on the material container and the ventilation device is disposed opposite on the cover.

Alternatively, the material outlet, which in turn can be designed in particular as an outlet port, can be disposed on the cover and the ventilation device can be disposed opposite on the bottom of the material container.

The flow cup is a consumable that is preferably (at least partially) made of plastic in an injection-molding method. It is particularly advantageous here if the cover of the flow cup and/or the material container of the flow cup are made in one piece from plastic in a plastic injection-molding method. The closure element is also preferably produced as a one-piece component in an injection-molding method. The closure element can also be produced together with the cover or cup (e.g. connected via a film hinge) in an injection-molding tool.

It is understood that individual additional components such as sieve elements, etc., do not have to be molded together with the cover or the material container, so that the cover or the material container can be regarded as manufactured in one piece.

However, a joint one-piece production is quite conceivable.

The ventilation device is preferably disposed on the outside of a disk-shaped end wall which closes the material container at the front, the end wall being provided with a concavity which extends evenly over the end wall.

Thanks to the uniform concavity, the ventilation device axially projects to a lesser extent in relation to the peripheral region of the end wall, this reducing the space required by the material container. At the same time, the ventilation device is still freely accessible from the outside.

It goes without saying that the concavity is present in the basic state of the material container and not only when a force is applied to the end wall, e.g. by an internal pressure or the like.

In a particularly preferred embodiment, the ventilation means comprises an off-center ventilation opening through the concave end wall, which is offset towards the center of the end wall and is preferably greater than 5% and less than 10% of the diameter of the end wall. In this way, the ventilation device is disposed at least almost centrally on the end wall, but due to the eccentric arrangement of the ventilation opening, the injection point can be chosen as exactly as possible in the middle when producing the end wall in an injection-molding method.

A preferred exemplary embodiment is characterized by good accessibility of the corner region between the end base and a connected circumferential wall of the flow cup, in that the concave end wall adjoins the circumferential wall of the flow cup at an angle of greater than 90°.

The circumferential wall of the flow cup is preferably widened conically, starting from the end face which is closed by the concave end wall. Thanks to the conical configuration, the component of the flow cup that is closed with the end wall can be stacked one inside the other with other similar components, which enormously reduces the space required for the individual component during transport.

A variant is particularly preferred in which the conicity also results in the concave end wall adjoining the circumferential wall at an angle of greater than 90°. However, the angle is preferably less than 95°.

In the case of a preferred variant, a circumferential periphery is provided which projects outwards from the wall on which the ventilation device is disposed (preferably the concave end wall). The circumferential periphery can serve to hold back any coating material that may escape via the ventilation device. Depending on the design of the flow cup, the circumferential periphery can also serve as a standing periphery for the component of the flow cup that is provided with the ventilation device.

The movable closure element of the ventilation device preferably stands back from the circumferential periphery in the closed position and/or projects in relation to the circumferential periphery in the maximum open position.

BRIEF DESCRIPTION OF THE DRAWINGS

The invention will be explained hereunder by means of exemplary embodiments. In the figures.

DETAILED DESCRIPTION

Figure 1:
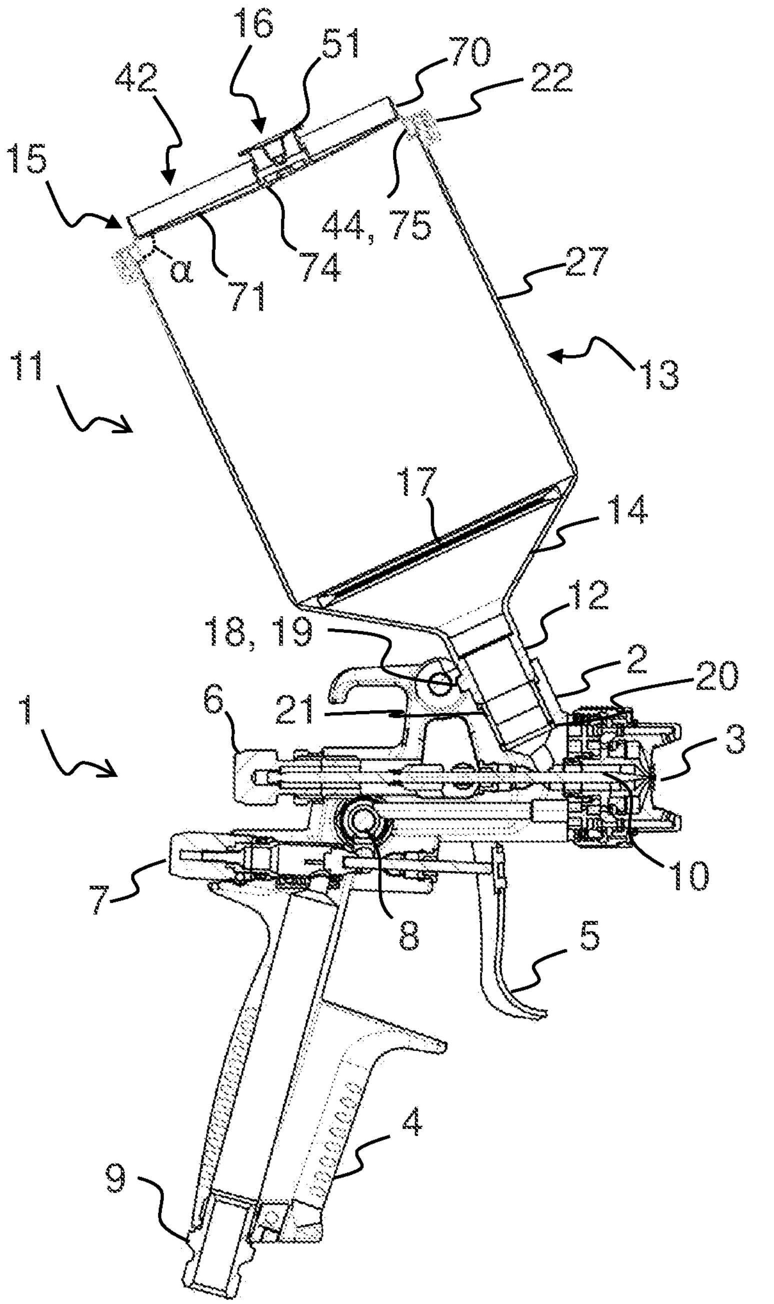
FIG. 1 shows a sectional illustration of a spray gun with a flow cup according to a first exemplary embodiment of the invention.

FIG. 1 shows a hand-held spray gun 1 for the compressed air-assisted atomization and application of a free-flowing coating material. The spray gun 1 can be designed, for example, as a so-called high-pressure, compliant or as an HVLP spray gun 1. The spray gun 1 has a cup connection 2 and a nozzle head 3 at which coating material supplied to the spray gun 1 via the cup connection 2 is atomized and emerges in the form of a spray jet.

Furthermore, the spray gun 1 comprises a handle 4, a trigger 5 for actuating a material needle 10 disposed inside the spray gun 1, an adjustment mechanism 6 for the stroke of the material needle (material quantity regulation), an air pressure adjustment device 7 (micrometer), a round/broad jet adjusting device 8 and a compressed air connection 9. By means of the round/broad jet adjustment device 8, the proportion of the compressed air supplied as e.g. atomization and transport air on the one hand and horn air for a wide beam formation on the other hand, can be varied.

A flow cup 11 is connected to the cup connection 2 of the spray gun 1 by means of a material outlet configured as an outlet port 12. The flow cup 11 has a material container 13 on the bottom 14 of which the outlet port 12 is formed. Furthermore, the flow cup 11 comprises a screw cover 15 which closes the material container 13 and is provided with a ventilation device 16. The ventilation device 16 enables pressure equalization when coating material flows out of the flow cup 11 via the outlet port 12. Inside the material container 13 there is a sieve element 17 through which the coating material must pass before it can leave the material container 13 via the outlet port 12.

The outlet port 12 is equipped with connection means in the manner of a bayonet lock, which include a clamping wedge element 18 protruding radially from the outlet port 12. The clamping wedge element 18 engages in a corresponding receptacle groove 19 on the spray gun 1. The outlet port 12 seals axially e.g. by means of its end face 20 on the cup connection 2 and/or radially with the aid of two circumferential radial sealing lips 21 (hardly visible in FIG. 1 due to the proportions, see also FIG. 10).

The flow cup 11 according to FIG. 1 is designed as a standard flow cup.

Figure 2:
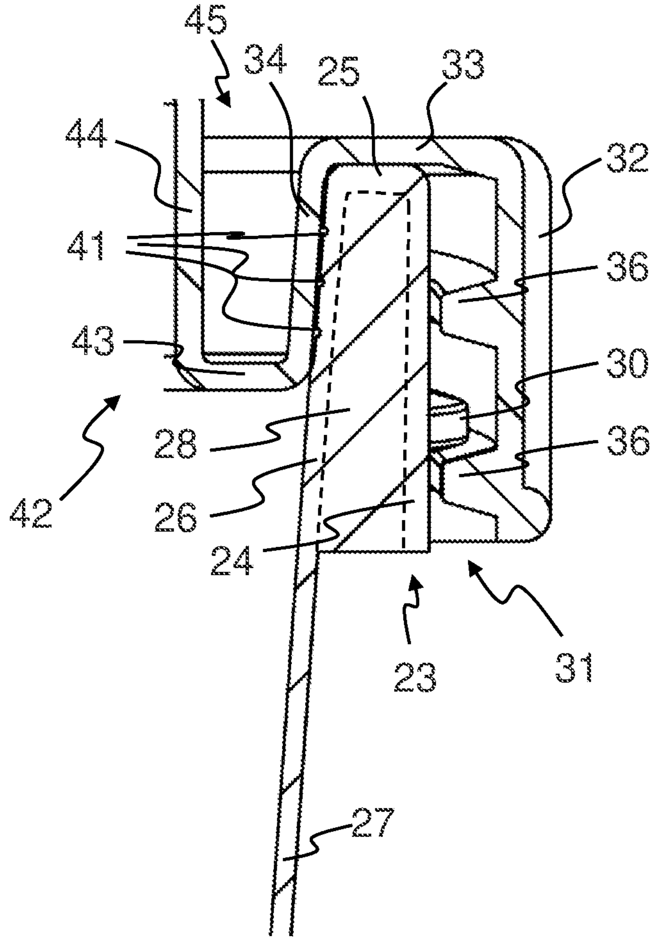
FIG. 2 shows a partial sectional view of the flow cup according to FIGS. 1 and 9 in the region of the connection between the cover and the material container of the flow cup.

The screw connection 22 between the screw cover 15 and the material container 13 is described in detail below with reference to FIG. 2. The embodiment of the screw connection 22 can be regarded as an independent subject matter of the invention, independently of the design of the ventilation device 16. FIG. 2 shows an enlarged section of the flow cup 11 according to FIGS. 1 and 9 in the region of the connection point between screw cover 15 and material container 13.

The peripheral region of the material container 13 is provided with an eversion 23 which is reinforced by means of a plurality of radial transverse ribs 28. The transverse ribs 28 end almost flush with the outer periphery of the eversion 23. The eversion 23 has an outer leg 24, a central connecting web 25 and an inner leg 26. The inner leg 26 transitions into a circumferential wall 27 of the material container 13. A section through a radial transverse rib 28, which is molded so as to be integral to the outer and the inner leg 24, 26 and the central connecting web 25, is shown in FIG. 2. The dashed lines in FIG. 2 indicate the profile of the outer leg 24 and the inner leg 26 and of the central connecting web 25.

Figure 12:
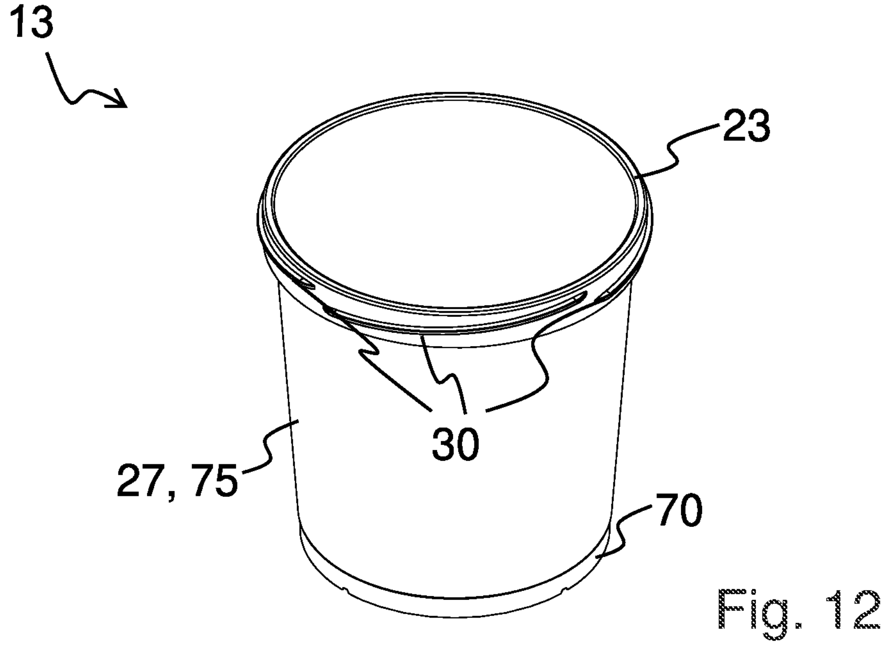
FIG. 12 shows a perspective view of the material container of the flow cup according to FIG. 9.

Four threaded elements in the form of threaded webs 30 are provided on the outside of the outer leg 24 of the eversion 23. The threaded webs 30 are structurally identical to the threaded webs 30 shown in FIG. 12. FIG. 12 shows the material container 13 of a second exemplary embodiment of a flow cup 11, which will be described in more detail later, but whose screw connection 22 is of identical design and is therefore likewise shown in FIG. 2.

The peripheral region of the screw cover 15 has a receptacle groove 31 which is also formed by an outer leg 32 a central connecting web 33 and an inner leg 34. In the closed state of the flow cup 11, the receptacle groove 31 encompasses the eversion 23 in the peripheral region of the material container 13.

Inside the receptacle groove 31, more precisely on the inside of the outer leg 32, four threaded ridges 36 are formed, which together with the threaded ridges 30 on the material container 13 form the multi-threaded screw connection 22. All four threaded webs 36 begin approximately at the lower periphery of the outer leg 32 and open into the middle connecting web 33 which forms the bottom of the receptacle groove 31. The threaded webs 36 therefore partially overlap in the circumferential direction, but are axially offset from one another in the overlapping region. This can also be seen from FIG. 2, which shows two threaded webs 36 lying axially one above the other and overlapping in the circumferential direction. This can be seen even more clearly in FIG. 11, which shows a sectional illustration through the screw cover 15 of the second exemplary embodiment, in which the screw connection 22, as already mentioned, is of identical design.

The fluid-tight seal between screw cover 15 and material container 13 is achieved by a circumferentially sealing, radial and axial contact inside the receptacle groove 31. Specifically, the radial sealing occurs between the outside of the inner leg 34 of the receptacle groove 31 and the inside of the inner leg 26 of the eversion 23 of the material container 13. The axial seal takes place between the top of the middle connecting web 33 of the eversion 23 and the bottom of the middle connecting web of the receptacle groove 31.

In an exemplary embodiment that is not shown, analogously to the exemplary embodiment according to FIG. 2, radial sealing between the outside of the inner leg 34 of the receptacle groove 31 and the inside of the inner leg 26 of the eversion 24 of the material container 13, but instead of the additional axial sealing, no radial sealing (and supporting), or radial sealing (and supporting) between the inside of the outer leg 32 of the receptacle groove 31 and the outside of the outer leg 24 of the eversion 23 of the material container 13 may take place. The second radial sealing, and optionally supporting, can preferably take place near the corner region at the transition from the outer leg 24 to the central connecting web 25 of the eversion 23.

By way of example, three circumferential sealing ribs 41 are shown in FIG. 2, which are molded on the outside of the inner leg 34 of the receptacle groove 31 and lead to a further reinforcement of the sealing effect. Moreover, the sealing effect is improved by the fact that the internal diameter of the material container 13 in the upper peripheral region is selected in such a manner that the material container 13 is spread open when the screw cover 15 is installed, at least in the region of the eversion 23, thus resulting in a particularly strong and sustained radial compression between the screw cover 15 and material container 13.

It goes without saying that, as an alternative or in addition, further sealing ribs, lips, beads can also be formed at other points in order to increase the sealing effect. Alternatively, for example, only axial or only radial sealing between the screw cover and the material container 13 can also take place.

A central region 42 of the screw cover 15 is designed as a continuation of the inner leg 34 of the receptacle groove 31. In FIG. 2 only an outer portion of the central portion 42 of the screw cover 15 is shown. In particular, the inner leg 34 is followed by a first annular portion 43 of the central region 42 which extends at least almost perpendicularly to the receptacle groove 31. The annular portion 43 is followed by a second annular portion 44 of the central region 42 which runs at least almost parallel to the inner leg 34, specifically in such a manner that a compensating ring groove 45 is formed which is open in the opposite direction to the receptacle groove 31. By means of the compensating ring groove 45 e.g. manufacturing tolerances of the components can be compensated, in particular to ensure the functionality, strength and tightness of the screw connection 22. In addition, a desired support or rigidity of the inner leg 34 can be defined via the dimensioning of the compensating ring groove 45.

As can be seen from FIG. 1, the central region 42 of the screw cover 15 in the case of the exemplary embodiment according to FIG. 1 is provided with a ventilation device 16 which enables pressure equalization when coating material flows out of the flow cup 11 via the opposite outlet port 12. The construction of the ventilation device 16 will be explained in more detail hereunder by means of FIGS. 3 to 5, which show the ventilation device 16 in three different states, and FIGS. 6 and 7.

The ventilation device 16 is designed as a snap-in valve. It comprises a movable cap-shaped closure element 51 with a cap plate 52 from which a hollow collar 53 and a central hollow protuberance project. The hollow protuberance forms a hollow sealing plug 55 which projects axially relative to the hollow collar 53 by a distance which at least almost corresponds to the wall thickness of the flow cup 11 in the region of the ventilation device 16 (see also FIG. 6).

The sealing plug 55 is provided with a encircling shoulder 56 from which in turn an almost cylindrical plug tip 57 projects. The hollow collar 53 has first and second latching lugs 58, 59 which are axially offset relative to one another on the external circumference. The first and second latching lugs 58, 59 are spaced apart from one another in the circumferential direction, as a result of which air channels 60 are formed.

Figure 6:
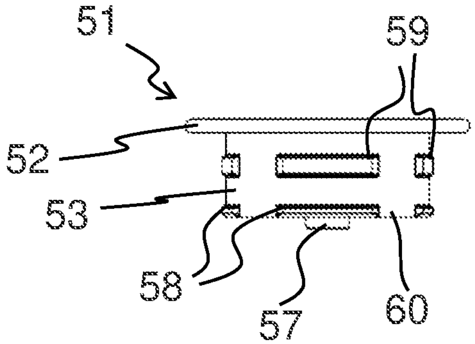
FIGS. 6 and 7 shows a perspective and a lateral view of the closure element of the ventilation device of the flow cup according to FIGS. 1 and 9.
Figure 7:
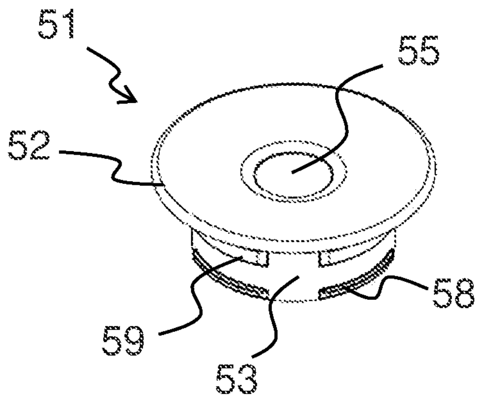

The construction of the closure element 51 is shown in particular in FIGS. 6 and 7, which show the closure element 51 in a side view and a perspective top view. The embodiment of the closure element 51 can be regarded as an independent subject matter of the invention, independently of the design of the rest of the ventilation device 16.

On the outside of the flow cup 11, the ventilation device 16 has a ventilation opening 61 and three hollow collars disposed concentrically to the ventilation opening 61. The outer hollow collar 62 is provided on its inner circumference on its open end face with an insertion chamfer 63 for the closure element 51 and a subsequent encircling latching edge 64. The central hollow collar 65 forms a separate centering, retaining and guiding device. It is provided with a centering chamfer 66 on its external circumference on its open end face. The inner hollow collar 67 forms the periphery of the ventilation opening 61 and is provided with a centering chamfer 68 on its inner circumference on its open end face.

The outer hollow collar 62 projects from the outside of the flow cup 11 by approximately three to four times the amount compared to the other two hollow collars 65, 67. The central hollow collar 65 projects from the inner hollow collar 67 approximately by the amount by which the closure plug 55 projects from the hollow collar 53 on the closure element 51.

To assemble the ventilation device 16, the closure element 51 is inserted into the outer hollow collar 62, which is facilitated by the insertion chamfer 63. The closure element 51 can be attached to the screw cover 15 or the material container 13 of the flow cup 11 separately from the flow cup 11 or e.g. via a tear-off tab, web, film hinge, etc. and thus made available to the user. The ventilation device 16 can also be pre-assembled in the factory and delivered to the user in working order.

Figure 3:
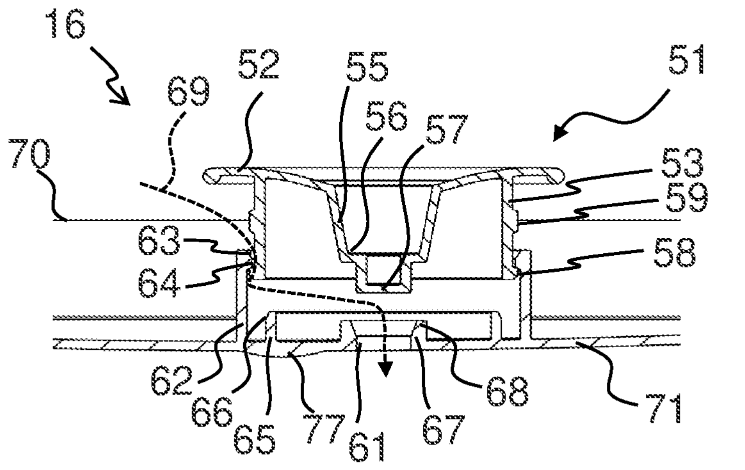
FIGS. 3 to 5 show partial sectional views of the flow cup according to FIGS. 1 and 9 in the region of the ventilation system in three different states.

In FIG. 3 the ventilation device 16 is shown in the maximum open position of the closure element 51. The first latching lugs 58 on the hollow collar 53, which is disposed on the closure element 51, engage behind the encircling latching edge 64 on the outer hollow collar 62 on the outside of the flow cup 11. Due to the interaction of the first latching lugs 58 and the encircling latching edge 64, the closure element 51 is captively attached to the flow cup 11. The frictional connection between the hollow collars 53, 62 prevents the closure element 51 from moving downwards from the maximum open position in FIG. 3 without an external force device or solely by the effect of gravity. Specifically, the first latching lugs 58 are designed in such a manner that they are pressed radially with the inner peripheral surface of the outer hollow collar 62. But it is also conceivable that further latching means, e.g. in the form of a second encircling latching edge, which counteract an undesirable slipping and tilting of the closure element 51, are molded below the end-side latching edge 64.

In the maximum open position shown, there is a certain amount of play between the encircling latching edge 64 on the outer hollow collar 62 and the outer peripheral surface of the hollow collar 53, through which play air can enter the flow cup 11. The flow path via which air from the outside gets into the interior of the flow cup 11 in order to ensure pressure equalization when coating material leaves the material container 13 via the outlet port 12 is sketched in FIG. 3 as a dashed arrow 69. After the inflowing air has passed the play or the gap formed thereby at the latching edge 64, it flows between the first latching lugs 58 through the air channels 60 and finally through the ventilation opening 61 into the interior of the flow cup 11.

The constriction in the contact region of the outer hollow collar 62 and the hollow collar 53 has the advantage that even when the ventilation device 16 is in the open state, coating material is prevented from escaping if it sloshes or sprays out of the flow cup 11 through the ventilation opening 61 during the spraying process.

In addition, it is also conceivable that the encircling latching edge 64 is embodied with many smaller openings, i.e. in a segmented manner, so that the incoming air can flow through these openings and not (only) through the gap formed by the play between latching edge 64 and the external circumferential face of the hollow collar 53. In this case, play between the latching edge 64 and the outer peripheral surface of the hollow collar 53 can also be completely dispensed with and the two components fit together at the point.

The closure element 51 and in particular the cap plate 52 project significantly beyond an outer circumferential periphery 70 of the flow cup 11. An exemplary configuration of the circumferential periphery 70 can be seen in FIG. 1.

Thanks to the overhang, a user can clearly see when the ventilation device 16 is in the open state. In addition, when the flow cup 11 is placed on the circumferential periphery 70 with the side equipped with the ventilation device 16 facing down and a user has failed to close the ventilation device 16 beforehand, the closure element 51 automatically pushed towards the closed position by the surface on which the flow cup 11 is to be deposited. This prevents large quantities of the coating material from accidentally escaping. If he places the (still) empty flow cup 11 with the ventilation device 16 open on the circumferential periphery 70, the flow cup 11 tilts back and forth due to the protruding cap plate 52, which advantageously draws the user's attention to the ventilation device 16 that is still open before he fills in the coating material.

Figure 4:
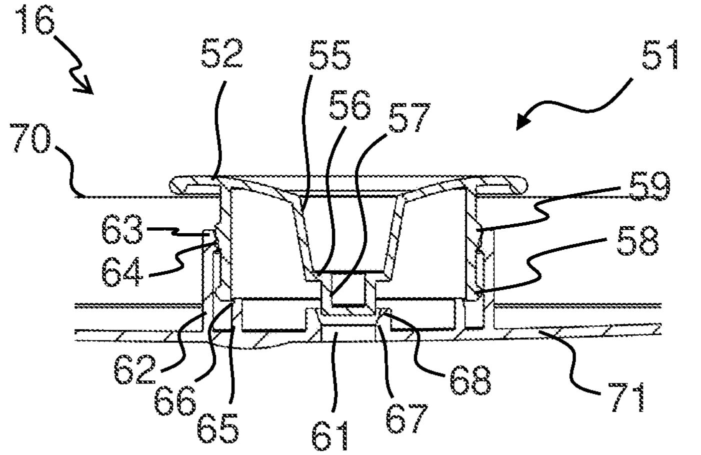

In order to close the ventilation device 16 in the usual way, a user presses on the cap plate 52, as a result of which the closure element 51 moves downward in a straight line until it initially assumes the intermediate position according to FIG. 4. In the course of this first section of the closing movement, the closure element 51 is guided by the interaction of the two hollow collars 53, 62. In particular, the closure element 51 is guided by the first latching lugs 58 sliding along the inner peripheral surface of the outer hollow collar 62.

In the intermediate position according to FIG. 4, the second latching lugs 59 meet the latching edge 64 on the outer hollow collar 62. At least almost simultaneously, the end face of the hollow collar 53 hits the centering chamfer 66 on the central hollow collar 65 and the plug tip 57 hits the centering chamfer 68 on the inner hollow collar 67. The meeting at the three different points results in a precise and functionally reliable centering of the closure element 51 and in particular of the closure plug 55 before the closure plug 55 penetrates into the ventilation opening 61 during the further closing movement.

Figure 5:
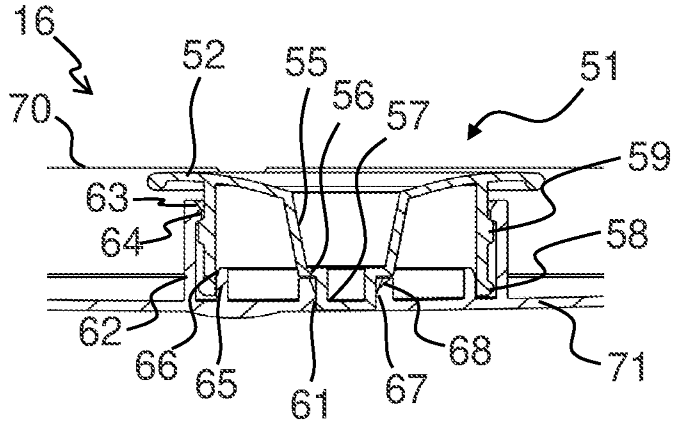

The last part of the closing movement follows, in which the closure element 51 is transferred from the intermediate position shown in FIG. 4 to the closed position shown in FIG. 5. In this movement section, the closure element 51 is additionally guided by the interaction of the hollow collar 53 and the central hollow collar 65. Specifically, the inner peripheral surface of the concave collar 53 slides along the outer peripheral surface of the central concave collar 65. In this very delicate movement section, the closure element 51 is guided in a very robust and stable manner.

In FIG. 5 the closure element 51 assumes the closed end position. The sealing plug 55 closes the ventilation opening 61. It is in sealing contact with the inner peripheral surface of the opening 61. In this state, air cannot flow into the flow cup 11 via the ventilation device 16, and nor can coating material escape from the flow cup 11 via the ventilation device 16.

The fact that the end face of the hollow collar 53 is disposed or enclosed in an annular space between the outer hollow collar 62 and the central hollow collar 65 also results in a type of labyrinth retention device. As a result, in particular, coating material is held back that has entered the space between the inner and central hollow collars 67, 65 before the ventilation device 16 is closed, thus preventing it from getting out into the environment.

In particular, the inner peripheral surface of the hollow collar 53 can also lie tightly in an encircling manner against the outer peripheral surface of the central hollow collar 65 so that an escape of coating material is counteracted even more effectively.

It can be seen from FIG. 5 that the shoulder 56 on the closure plug 55 rests on the end face of the inner hollow collar 67 in the closed end position, which defines the axial position of the closure element 51 in the closed end position. The defined axial stop ensures that the closure plug 55 does not penetrate too far into the interior of the flow cup 11 and does not project inward relative to the end wall 71.

Furthermore, it can be seen from FIG. 5 that the cap plate 52 now stands back from the circumferential periphery 70. The closure element 51 is held in a functionally reliable manner in the closed end position by the interaction of the second latching lugs 59 on the hollow collar 53 and the encircling latching edge 64 on the outer hollow collar 62.

In order to open the ventilation device 16 again, a user can grip the closure element 51 on the cap plate 52 and pull it upwards back into the maximum open position according to FIG. 3.

Figure 8:
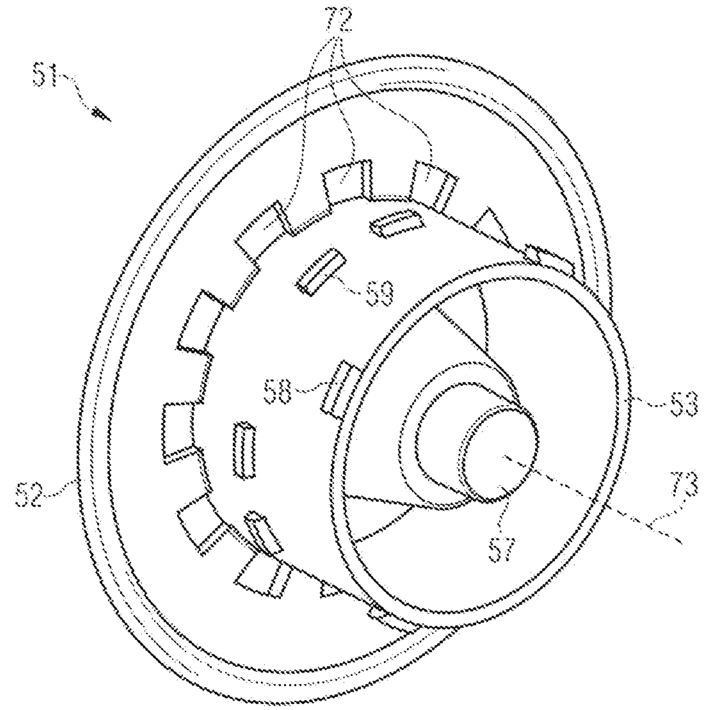
FIG. 8 shows a perspective view of an alternative embodiment of the closure element of the ventilation device of the flow cup according to FIGS. 1 and 9.

FIG. 8 shows an alternative second embodiment of a closure element 51, which largely corresponds to the first embodiment, so that identical and similar components are given the same reference numbers. The second embodiment of the closure element 51 can also be regarded as an independent subject matter of the invention, independently of the embodiment of the rest of the ventilation device 16. The second exemplary embodiment differs only in that the first and second latching lugs 58, 59 are disposed offset from one another not only axially but also in the circumferential direction. Each latching lug 58, 59 is assigned an overlying opening 72 in the cap plate 52. Thanks to these measures, the closure element 51 can be produced without forced demolding using a simple two-part injection-molding tool, the tool parts of which are brought together and apart along the longitudinal axis 73 of the closure plug 55.

Figure 13:
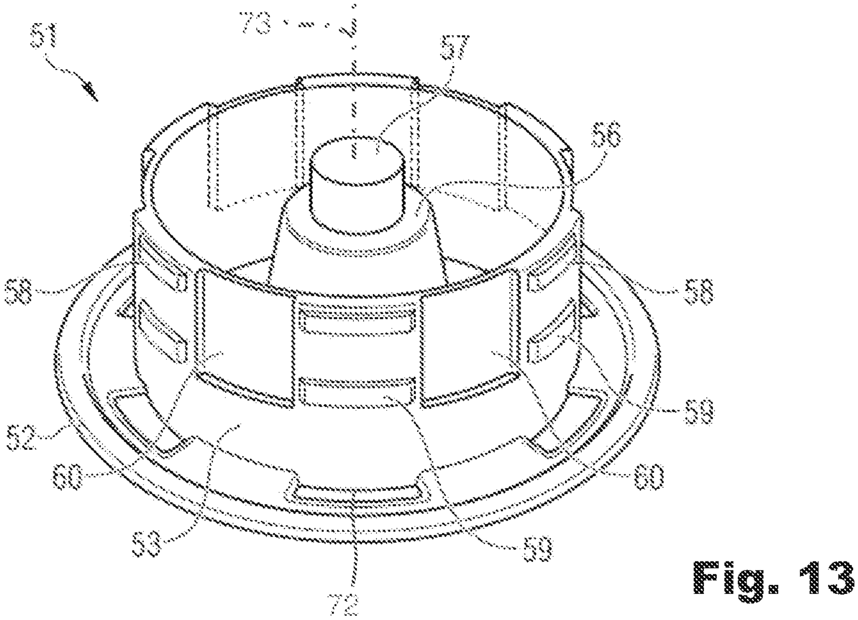
FIGS. 13 and 14 show a perspective view and a top view of an alternative embodiment of the closure element of the ventilation device of the flow cup according to FIGS. 1 and 9.
Figure 14:
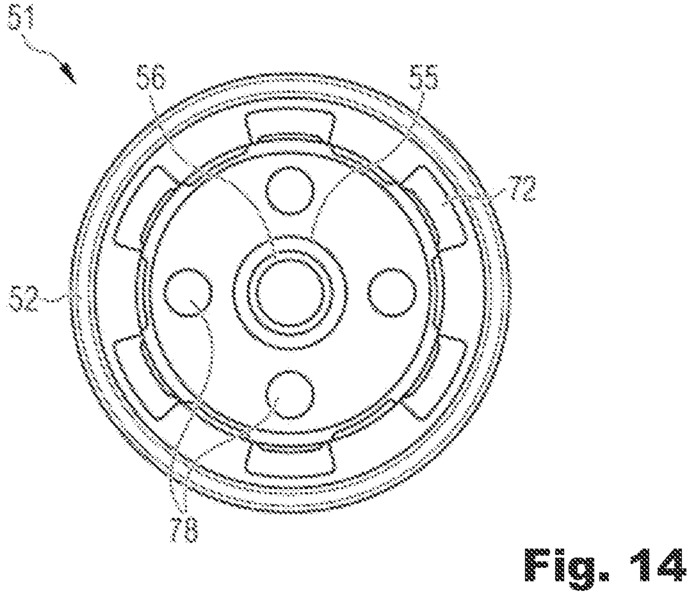

Shown in FIGS. 13 and 14 is an alternative third embodiment of a closure element 51, which largely corresponds to the first and second embodiment, so that identical and similar components are denoted by the same reference numbers. The third embodiment of the closure element 51 can also be regarded as an independent subject matter of the invention, independently of the embodiment of the rest of the ventilation device 16. The third exemplary embodiment is distinguished in comparison to the other exemplary embodiments in that six pocket-shaped recesses are formed by reducing the wall thickness in the circumferential direction between the six sections with the latching lugs 58, 59, which serve as air ducts 60 or lead to an enlargement of the air ducts 60, when the closure element 51 is disposed in the maximum open position on the flow cup 11. Furthermore, the rigidity of the hollow collar 53 is specifically adjusted by the pocket-shaped recesses.

The cap plate 52 of the closure element 51 has a plurality of openings 72 like the exemplary embodiment according to FIG. 8. An opening 72 in the cap plate 52 is assigned to each latching lug 59. Thanks to these measures, the latching lugs 59, which are particularly important for functionally reliable holding of the closure element 51 in the closed position, can be produced without forced demolding and in a tool-dependent manner using a simple two-part injection mold, the tool parts of which are brought together and apart along the longitudinal axis 73 of the closure plug 55. On the other hand, the latching lugs 58, which are disposed offset only axially but not in the circumferential direction with respect to the latching lugs 59, are produced by forced demolding. Four circular imprints are visible on the cap plate 52, which originate from ejectors of the injection-molding tool for producing the closure element 51.

Figure 9:
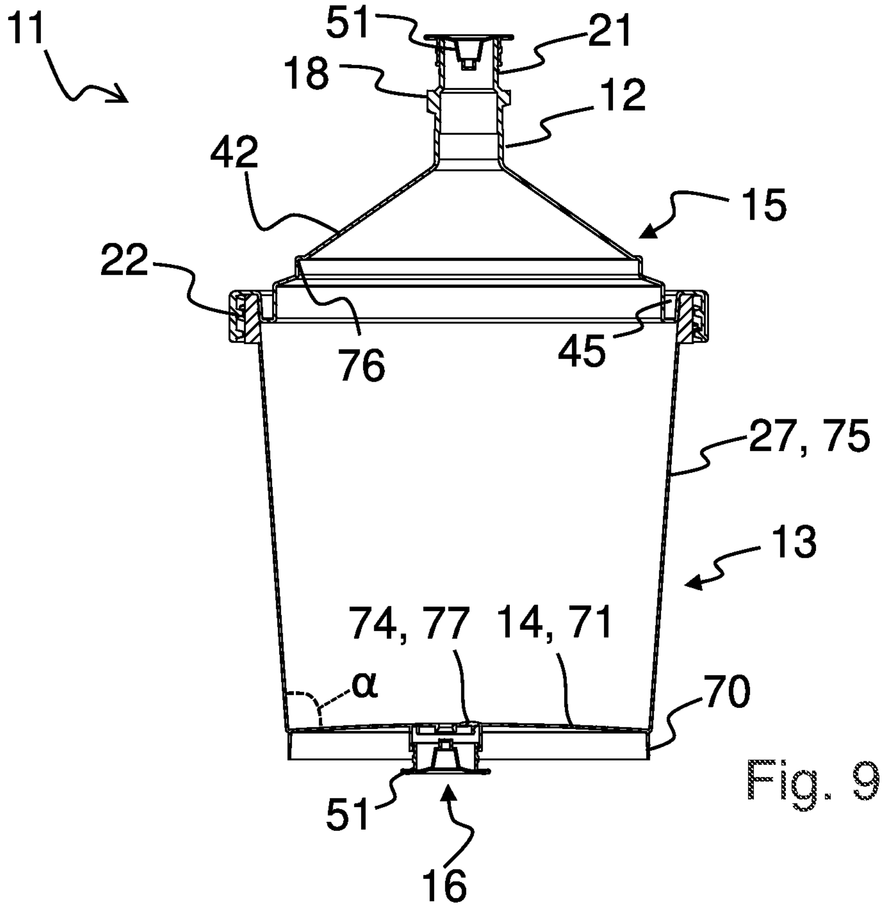
FIG. 9 shows a sectional view a flow cup according to a second embodiment of the invention.

It can be seen from FIGS. 1 and 9 that the ventilation device 16 is disposed on the outside of the end wall 71 of the flow cup 11, which is provided with a concavity which extends evenly over the end wall 71.

The point 74 of the concave end wall 71, which protrudes furthest inward due to the concavity, has an offset of 1% to 4%, more precisely 2% to 3%, of the diameter of the end wall 71 relative to the outer peripheral region of the end wall 71. In the embodiment shown, the diameter is e.g. d=84.6 mm and the offset e.g. V=2.0 mm.

A circumferential wall 75 of the flow cup 11 borders on the concave end wall 71. The surrounding wall 75 is closed by the concave end wall 71. The circumferential wall 75 is conical to such an extent that the concave end wall 71

(despite the concavity) adjoins the circumferential wall 75 at an angle of greater than 90°. In the exemplary embodiments shown, an angle α of approximately 92° results.

Due to the proportions in FIG. 1, this can hardly be seen. For a better understanding, reference is therefore made to the exemplary embodiment shown in FIG. 9. The second exemplary embodiment is explained in more detail below.

The exemplary embodiment of a flow cup 11 according to the invention shown in FIG. 9 and FIGS. 10 to 12 largely corresponds to the first exemplary embodiment, so that the same reference numbers are used for identical or similar components.

Overall, the flow cup 11 according to the second exemplary embodiment is designed as an upside-down flow cup.

The flow cup 11 also has a screw cover 15 and a material container 13 which can be closed in a fluid-tight manner by means of the screw cover 15. In contrast to the first exemplary embodiment, the outlet port 12 is disposed on the screw cover 15 and the ventilation device 16 is disposed on the bottom of the material container 13. A sieve element receptacle 76 for a flat, disk-shaped sieve element (not shown) is provided in the screw cover 15, analogously to the sieve element 17 shown in FIG. 1. As an alternative to a flat sieve element, a cylindrical plug-in screen can be used, which can be fixed in the outlet port 12 or in the cup connection 2 on the spray gun side. This also applies to the first exemplary embodiment according to FIG. 1.

The connection means, by means of which the outlet port 12 can be mounted on a spray gun 1, correspond to the connection means on the outlet port 12 of the first exemplary embodiment, so that reference is made to the corresponding passages in the description of the figures.

The screw connection 22, the ventilation device 16 including the concave end wall 71 on which the ventilation device 16 is disposed correspond in structure and function to that of the first exemplary embodiment of a flow cup 11, so that reference is also made to the relevant passages.

Based on FIGS. 9 to 12 it follows that the concave end wall 71 forms the bottom 14 of the cup-shaped material container 13. In the exemplary embodiment shown, the end wall 71 is produced in one piece with the circumferential wall 75 and the circumferential periphery 70 of the material container 13. Thanks to the conical design of the circumferential wall 75 of the material container 13 and the concavity of the end wall 71 forming the base 14, a plurality of material containers 13 can be stacked closely one inside the other.

It can be seen from FIG. 9, which shows a sectional view of the entire flow cup 11, that the closure element 51 of the ventilation device 16 can also serve as a closure element 51 for the outlet port 12. The same also applies to the outlet port 12 of the first exemplary embodiment.

Figure 10:
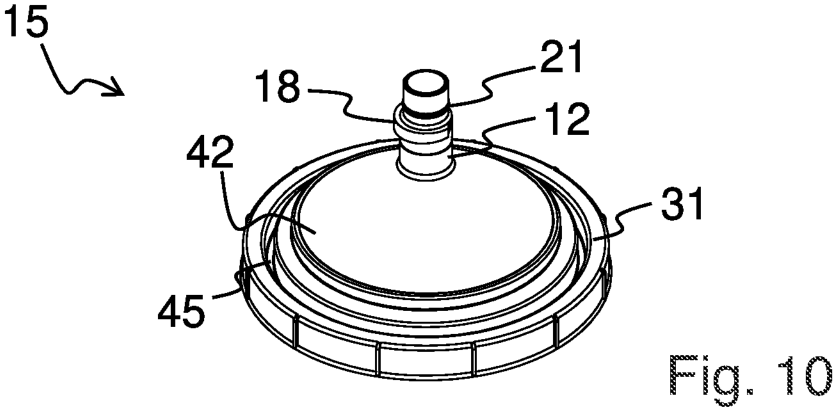
FIGS. 10 and 11 show a perspective and a sectional view of the cover of the flow cup according to FIG. 9.

In FIG. 10, which shows a perspective top view of the screw cover 15 without the closure element 51 on the outlet port 12, the compensating ring groove 45, which follows the receptacle groove 31 in the screw cover 15, and the connection and sealing means on the outlet port 12 in the form of the clamping wedge element 18 and the radial sealing lips 21 are clearly visible.

Figure 11:
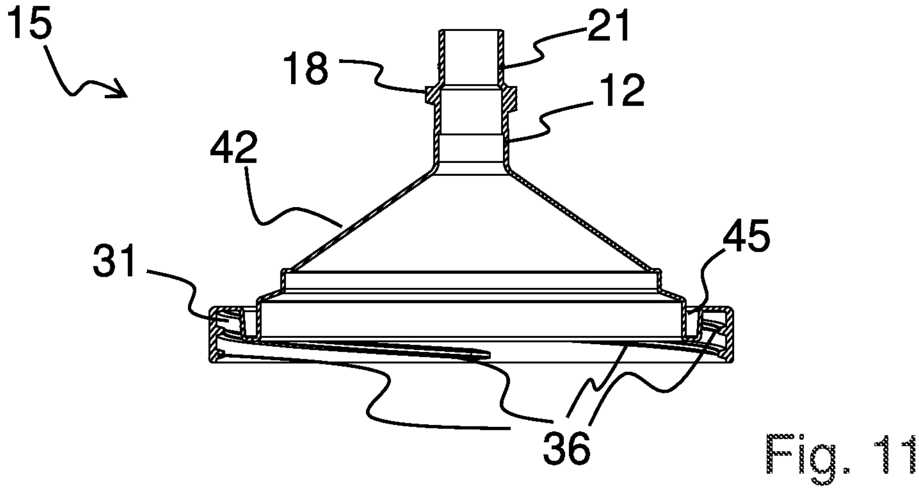

FIGS. 11 and 12 serve in particular to illustrate the configuration of the threaded webs 30, 36 of the screw connection 22 between the screw cover 15 and the material container 13. As already explained, this is a multi-threaded screw connection 22. Four threaded webs 30, 36 are formed on both the cover and the container side. The cover-proximal threaded webs 36 are disposed in the receptacle groove 31 and each run from the lower edge of the receptacle groove 31 to the bottom of the receptacle groove 31. The cover-proximal threaded webs 36 therefore partially overlap in the circumferential direction. The container-proximal threaded webs 30, on the other hand, do not overlap in the circumferential direction.

The flow cups 11 according to the first and second exemplary embodiment are preferably made of plastic in a plastic injection-molding method, with the screw covers 15 and the material containers 13 in each case being formed in one piece apart from the closure element 51 and the sieve elements 17.

In the case of an exemplary embodiment that is not shown, one or more closure elements 51 and/or one or more sieve elements 17 can also be produced in one piece with the screw cover 15 or the material container 13. For example, they can be attached at any point by tear-off webs, tabs, film hinges, etc., which can be severed in order to assemble the elements elsewhere.

The material containers 13 are made of polypropylene (PP), for example, and the screw covers 15 are made of, for example hard polyethylene or high-density polyethylene (HDPE) or polypropylene (PP). The closure element 51 is also made of, for example, hard polyethylene or high-density polyethylene (HDPE) or polypropylene (PP).

The flow cups 11 according to the invention are preferably extremely thin-walled products. The wall thickness of the material container 13 is in the range from 0.55 mm to 0.65 mm, specifically around 0.60 mm, and the wall thickness of the screw cover 15 is in the range from 0.75 mm to 0.85 mm, specifically 0.80 mm. The only exceptions are accumulations of material at local spots, e.g. for the formation of thread flanks, latching and gripping edges or on the outlet port, in particular for the formation of the clamping wedge element 18.

The screw cover 15 of the first exemplary embodiment and the material container 13 of the second exemplary embodiment are preferably produced in an injection-molding method in which the injection point of the components is in each case located as centrally as possible on the concave end wall 71. In order to make this possible, the ventilation device 16 is disposed slightly off-center. It is disposed with an offset of more than 5% but less than 10% of the diameter of the end wall 71 towards the middle of the end wall 71.

In FIG. 3, the injection point 77, which is also the point 74 (FIGS. 1 and 9, maximum concavity), can be seen to the left of the ventilation opening 61 from a smaller accumulation of material. In the exemplary embodiment shown, the offset between the eccentric ventilation opening 61 and the central injection point 77 is 5.50 mm, with a diameter of the end wall 71 of 84.6 mm, this corresponds to 6.50%.

The flow cup 11 according to the invention and the spray gun 1 equipped with it are suitable for atomizing and applying very different materials. One of the main fields of application is car repair painting, in which top coat, filler and clear coat are used and which places very high demands on atomization and the properties of the spray jet. However, a large number of other materials can also be processed using the flow cup 11 and a possibly modified spray gun 1. The decisive factor is that the materials are free-flowing and can be sprayed, at least to a certain extent.

The invention claimed is:

1. A flow cup for a spray gun, the flow cup comprising:
a material outlet configured for at least one of direct and indirect connection to the spray gun, a ventilation device via which air can flow into the flow cup in order to enable pressure equalization when coating material flows out of the flow cup via the material outlet, wherein the ventilation device comprises a closure element which is movable between at least one open position, in which air can flow into the flow cup, and a closed position in which no air can flow through the ventilation device into the flow cup, the closure element having a closure plug which, in the closed position of the closure element, closes a ventilation opening in the flow cup, wherein the ventilation device further comprises a latching device provided separately from the ventilation opening by means of which the closure element can be held in a latching manner at least in the closed position, wherein provided separately on an outside of the flow cup at a spacing from the ventilation opening and from the latching device is a separate centering, retaining and/or guiding device which as a centering, retaining and/or guiding device interacts with the closure element, and wherein at least in the closed position a portion of the closure element contacts an inner peripheral surface of the latching device and an outer peripheral surface of the separate centering, retaining and/or guiding device.

2. The flow cup as claimed in claim 1, wherein the latching device comprises an outer hollow collar and the separate centering, retaining and/or guiding device is comprises a central hollow collar.

3. The flow cup as claimed in claim 1, wherein the separate centering, retaining and/or guiding device is disposed radially between the latching device and the ventilation opening.

4. The flow cup as claimed in claim 1, wherein the closure element has a separate component that is separate from the closure plug in the form of a closure element hollow collar which interacts with the separate centering, retaining and/or guiding device, the closure element hollow collar being provided with latching means which interact with the latching device on the outside of the flow cup.

5. The flow cup as claimed in claim 4, wherein the closure plug projects axially in relation to the closure element hollow collar by a distance which is equal to a wall thickness of the flow cup in a region of the ventilation device.

6. The flow cup as claimed in claim 1, wherein the closure plug has a shoulder which, when interacting with a periphery of the ventilation opening, prevents an end face of the closure plug from protruding inwards in relation to a flow cup wall when the closure element is in the closed position.

7. The flow cup as claimed in claim 1, wherein an inner hollow collar which forms an edge of the ventilation opening, is provided on the outside of the flow cup, the inner hollow collar configured for centering the closure plug when closing the ventilation opening.

8. The flow cup as claimed in claim 1, wherein the ventilation device is configured such that the closure element when moving between the open position and the closed position is guided by an interaction between the latching device on the outside of the flow cup and a closure element hollow collar which is disposed on the closure element, the closure element being able to be centered and/or guided near the closed position by the separate centering, retaining and/or guiding device.

9. The flow cup as claimed in claim 1, wherein the separate centering, retaining and/or guiding device in the closed position of the closure element forms a sealing effect by way of a closure element hollow collar which is disposed on the closure element, bearing in a sealing manner on the separate centering, retaining and/or guiding device.

10. The flow cup as claimed in claim 1, wherein an end face of a closure element hollow collar which is disposed on the closure element, in the closed position of the closure element is disposed in an annular space between the latching device on the outside of the flow cup and the separate centering, retaining and/or guiding device.

11. The flow cup as claimed in in claim 1, wherein the closure element is embodied in a shape of a cap with a cap plate from which the closure plug and a closure element hollow collar projects.

12. The flow cup as claimed in claim 1, wherein the closure element is embodied in a shape of a cap with a cap plate which is provided with a number of cut-outs and/or which has a central hollow protuberance which forms the closure plug.

13. The flow cup as claimed in claim 1, wherein a closure element hollow collar disposed on an external circumference of the closure element, the closure element hollow collar is provided with first latching lugs which interact with latching means on the latching device on the outside of the flow cup in order to hold the closure member in the closed position.

14. The flow cup as claimed in claim 13, wherein the closure element hollow collar is further provided with second latching lugs on the external circumference that interact with the latching means on the latching device on the outside of the flow cup in order to keep the closure element captive in a maximum open position on the flow cup.

15. The flow cup as claimed in claim 13, wherein the closure element hollow collar is provided with pocket-shaped recesses on the external circumference, which serve as ventilation channels when the closure element is disposed in a maximum open position on the flow cup.

16. The flow cup as claimed in claim 15, wherein the closure element hollow collar is provided with pocket-shaped recesses on the external circumference, which serve as ventilation channels when the closure element is disposed in the maximum open position on the flow cup.

17. The flow cup as claimed in claim 1, wherein the latching device comprises an outer hollow collar on the outside of the flow cup, and wherein the outer hollow collar includes a latching edge in a region of an end face of the outer hollow collar on an inner peripheral surface of the outer hollow collar.

18. The flow cup as claimed in claim 1, wherein the flow cup has a material container and a cover which closes the material container in a fluid-tight and releasable manner, the material outlet being disposed on the material container.

19. The flow cup as claimed in claim 18, wherein the closure element, the cover of the flow cup and/or the material container of the flow cup are integrally produced from plastics material by a plastics injection-molding method.

20. The flow cup as claimed in claim 1, wherein the latching device comprises an outer hollow collar and the separate centering, retaining and/or guiding device comprises a central hollow collar on the outside of the flow cup.

21. The flow cup as claimed in claim 20, wherein the separate centering, retaining and/or guiding device is disposed radially between the latching device and the ventilation opening on the outside of the flow cup.

* * * * *